(No Model.)

H. H. BELKNAP.
TREE PROTECTOR.

No. 569,083. Patented Oct. 6, 1896.

Witnesses:
E. C. Wurdeman
J. J. Williamson

Inventor:
Harry H. Belknap
By Geo. H. Holgate
Attorney

UNITED STATES PATENT OFFICE.

HARRY H. BELKNAP, OF PHILADELPHIA, PENNSYLVANIA.

TREE-PROTECTOR.

SPECIFICATION forming part of Letters Patent No. 569,083, dated October 6, 1896.

Application filed September 20, 1895. Serial No. 563,072. (No model.)

*To all whom it may concern:*

Be it known that I, HARRY H. BELKNAP, a citizen of the United States, residing at Philadelphia, in the county of Philadelphia and State of Pennsylvania, have invented certain new and useful Improvements in Tree-Protectors, of which the following is a specification.

My invention relates to a new and useful improvement in tree-protectors, and has for its object to provide a device which, at a very small cost, may be readily applied to a tree and prevent the ascent of insects, especially caterpillars, from the ground to the branches and leaves of said tree.

With these ends in view my invention consists in the details of construction and combination of elements hereinafter set forth, and then specifically designated by the claim.

In order that those skilled in the art to which this invention appertains may understand how to make and use the same, I will describe its construction and operation in detail, referring by numbers to the accompanying drawings, forming part of this specification, in which—

Figure 1:
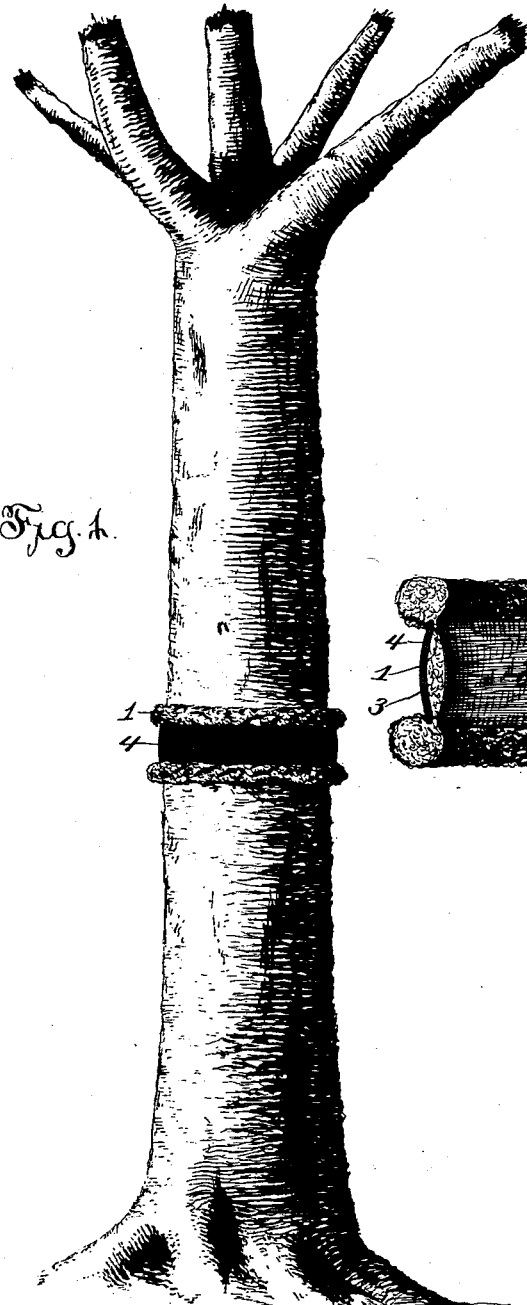
Figure 2:
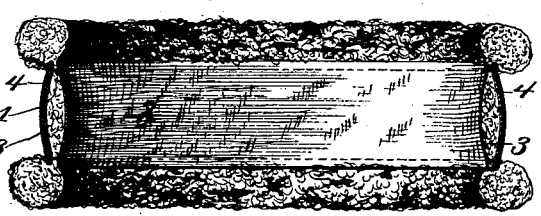

Figure 1 represents the trunk of a tree having my improvement applied thereto, and Fig. 2 a sectional view of the device.

Similar numbers denote like parts in both views of the drawings.

Heretofore great difficulty has been experienced in preventing the passage of insects from the ground to the branches of a tree, and while many devices have been produced for accomplishing this result they have either been too expensive to come into general use, or they have been so unsightly as to preclude their application to ornamental trees, or they have not been effectual in accomplishing the desired result; but I overcome all these disadvantages by taking a strip of cotton-batting 1, stitching strips of cloth 2 and 3 upon either side thereof along its center portion, leaving the edge sections of said batting free, and this stitching will compress the batting along the center portion, as clearly shown in Fig. 2, and causes its edge sections to assume a general circular shape. A strip of cloth or paper 4, having one of its surfaces covered with adhesive or sticky material, such as is used on ordinary fly-paper, is applied to one of the strips, previously described, with the sticky surface outward. This last-named strip may be either sewed to the device at the same time the first-named strips are stitched thereto or it may be glued or otherwise secured after said strips have been stitched in place.

To apply the device to a tree, it is only necessary to cut the strips in lengths sufficient to encircle the trunk of the tree at the point where it is desired to attach the device, and by overlapping the ends thereof it is firmly secured by driving small tacks through said ends. When thus applied, it will be seen that should insects undertake to ascend the tree they will first come in contact with the lower edge of the batting and in passing thereover will become more or less entangled in said batting, carrying with them some of the fibers therefrom, and when they pass upon the sticky surface this batting will assist in adhering them to said surface; but should they in any event reach the upper edge of the batting the sticky material with which they have become smeared will effectually entangle them in the fibers of the batting and prevent their further progress. Thus it will be seen that a very effectual and cheap device, which is easily applied, is provided by my improvement, and as the batting is securely stitched to the strips of cloth it will be seen that birds will not be able to tear it from its fastenings, as is often the case when batting is loosely nailed to a tree, thus destroying its usefulness.

The color of the sticky surface and the batting may be such as to correspond to that of the tree, which will prevent it from being objectionable to the eye.

Having thus fully described my invention, what I claim as new is—

A tree-protector composed of cotton-batting having binding-strips of cloth stitched upon either side, the edges of the batting being free and a strip having an adhesive or sticky material on one side secured to the binders as and for the purpose described.

In testimony whereof I have hereunto affixed my signature in the presence of two subscribing witnesses.

HARRY H. BELKNAP.

Witnesses:
S. S. WILLIAMSON,
SAMUEL L. TAYLOR.